Feb. 10, 1953
M. E. DROZ
2,627,673
RANGE AND ALTITUDE CALCULATOR FOR USE
WITH ECHO RANGING TRAINING EQUIPMENT
Filed June 1, 1951
4 Sheets-Sheet 1
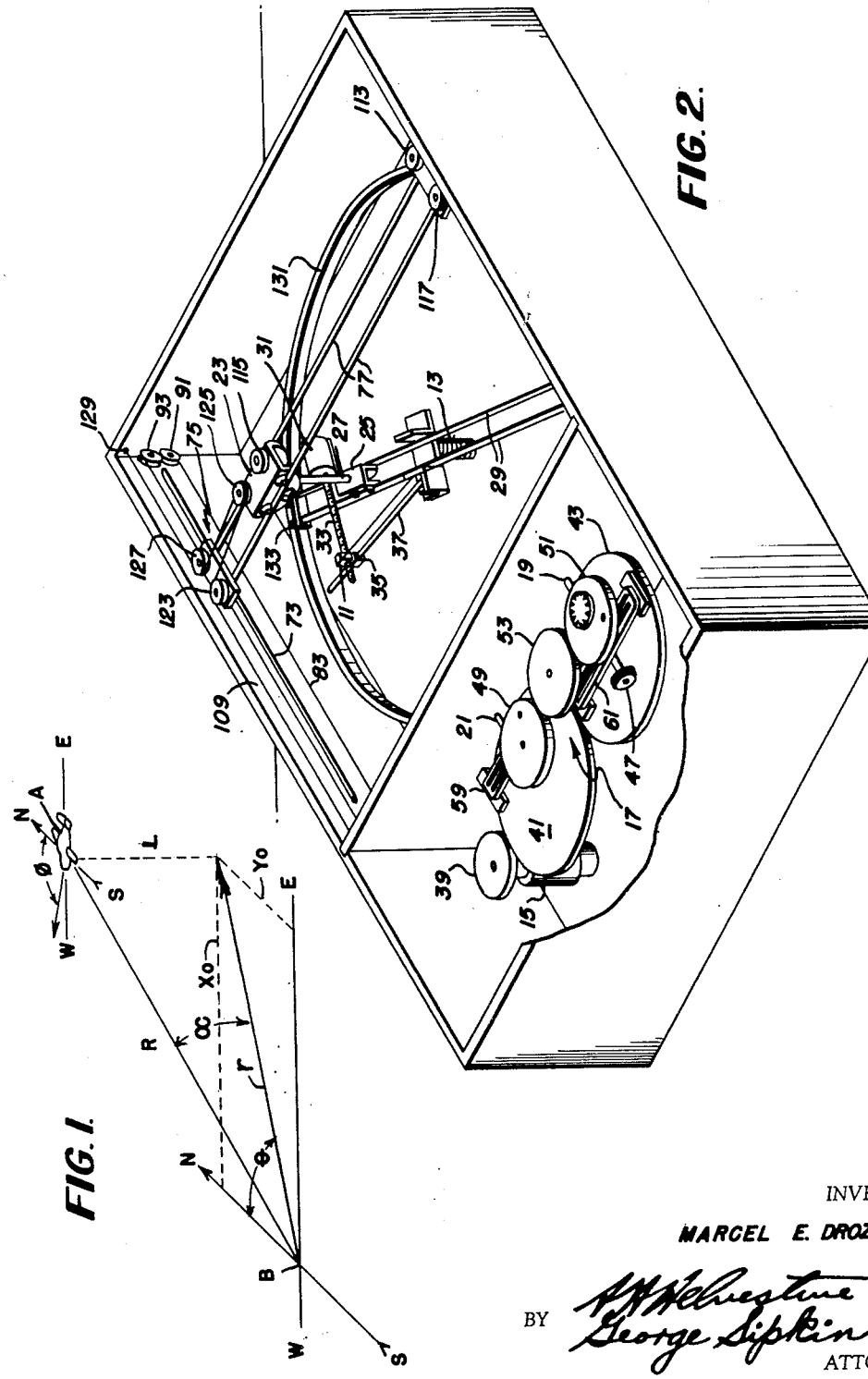
INVENTOR
MARCEL E. DROZ
BY
ATTORNEYS Feb. 10, 1953  M. E. DROZ  2,627,673
RANGE AND ALTITUDE CALCULATOR FOR USE
WITH ECHO RANGING TRAINING EQUIPMENT
Filed June 1, 1951  4 Sheets-Sheet 2

INVENTOR
MARCEL E. DROZ

BY
ATTORNEYS

INVENTOR
MARCEL E. DROZ
ATTORNEYS

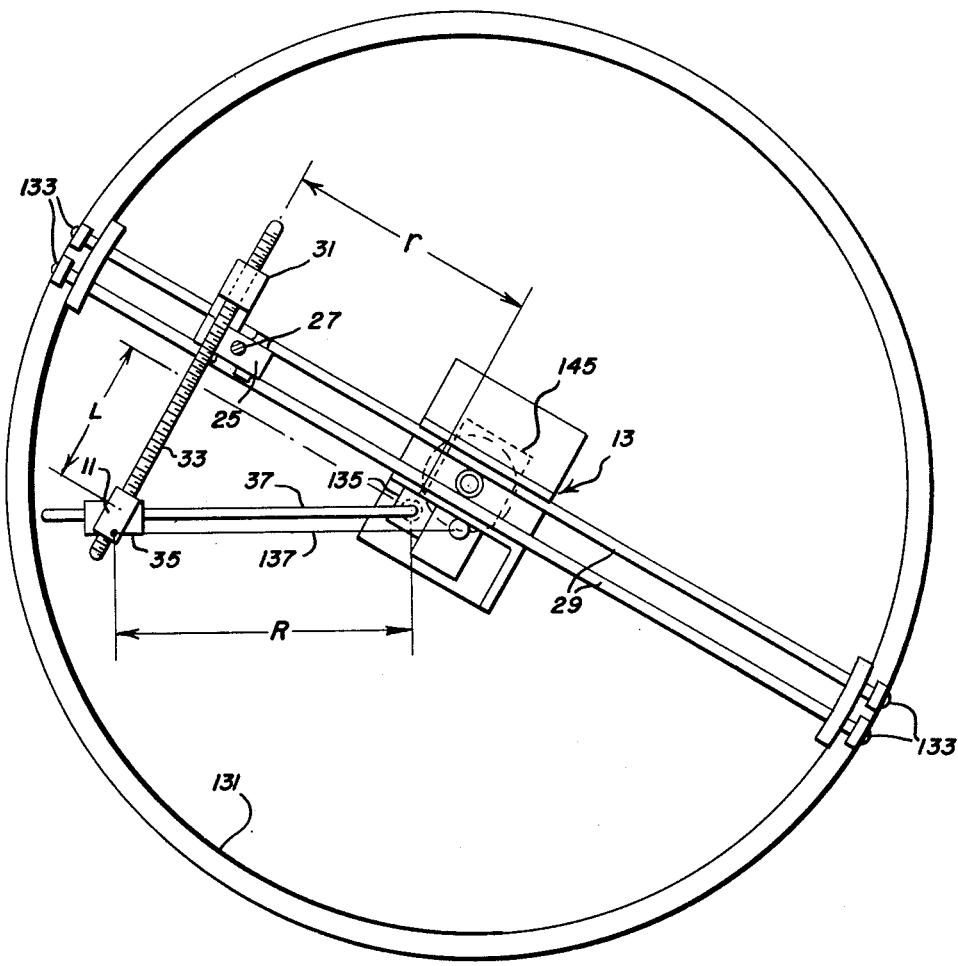

Patented Feb. 10, 1953

2,627,673

UNITED STATES PATENT OFFICE 2,627,673

RANGE AND ALTITUDE CALCULATOR FOR USE WITH ECHO RANGING TRAINING EQUIPMENT

Marcel E. Droz, Pleasantville, N. Y., assignor to the United States of America as represented by the Secretary of the Navy Original application August 21, 1946, Serial No. 692,021, now Patent No. 2,558,425, dated June 26, 1951. Divided and this application June 1, 1951, Serial No. 229,330

4 Claims. (Cl. 35—10.4)

The present invention relates to mechanical equation solvers and more particularly to range and altitude calculators for use with echo-ranging training equipment.

The present application is a continuation in part of my application, Serial No. 692,021, filed August 21, 1946, for Equation Solver, now Patent No. 2,558,425 of August 26, 1951, and directed to divisional subject matter of my above-identified prior application.

When training operators for echo-ranging equipment, it is inconvenient, expensive, and time-consuming to employ actual instruments in normal operation, which would require ships and airplanes. It is therefore a practical necessity to employ a simulator to produce similar indications to those which would be encountered in actual operation by means of small apparatus which may be conveniently located at a training station. The training equipment must be capable of converting the movements of a simulated target in space into polar coordinates relative to the simulated position of the echo-ranging equipment, since echo-ranging equipment produces indications of the azimuth, elevation angle and range to a target.

The present invention is directed to a device for producing voltages proportional to the azimuth, range and elevation angle of a simulated target relative to the simulated echo-ranging position suitable for application to conventional radar control equipment.

An object of the present invention is to provide a mechanical system for producing voltages representing the polar coordinates of a simulated target from a simulated radar position.

It is a further object of the present invention to provide a mechanical system wherein movements of a simulated target are reproduced as varying voltages representing polar coordinates of the simulated target from a predetermined point in space.

It is a still further object of the present invention to provide a mechanical system for producing voltages representing polar coordinates of a target from a predetermined point suitable for operation of radar control equipment.

Further objects and advantages of the present invention will be made readily apparent to those skilled in the art by reference to the following description and to the appended drawings in which:

Fig. 1 is a diagrammatical showing of the location of a target relative to a fixed point;

Fig. 2 is a prospective view of a preferred modification of the present invention;

Fig. 6 is a prospective view of the system for converting a position indication to a polar coordinate system relative to a point used in the present invention.

Figure 3:
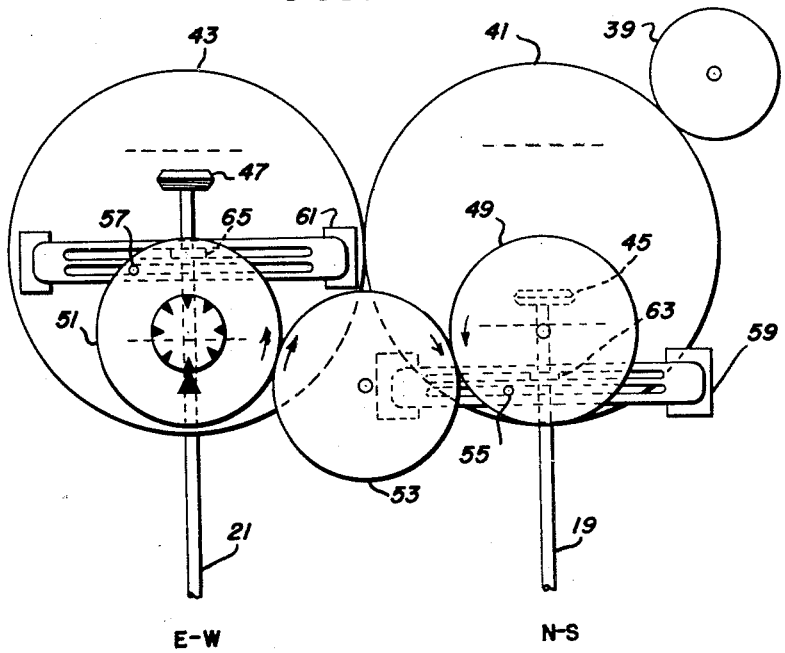
Fig. 3 is a plan view of a mechanical resolver for converting a speed vector into rectangular components of the vector.

Referring now to the drawings, there is diagrammatically shown in Fig. 1 the trigonometry involved in the polar location of an aircraft A relative to a fixed station B. The speed of the aircraft A is represented by the line V, and the direction of movement of the aircraft is indicated by the angle $\phi$. The ground range $r$ of the aircraft A relative to the fixed station B at any time $t$ is given by the following equation:

$$r\sqrt{\left[X_0+\int_{t_0}^{t}V\sin\phi dt\right]^2+\left[Y_0+\int_{t_0}^{t}V\cos\phi dt\right]^2}$$

where $X_0$ and $Y_0$ are respective rectangular coordinates at $t_0$. The azimuthal bearing $\theta$ of the aircraft A relative to the fixed station B is given by the following equation:

$$\theta=\tan^{-1}\left[\frac{X_0+\int_{t_0}^{t}V\sin\phi dt}{Y_0+\int_{t_0}^{t}V\cos\theta dt}\right]$$

The simultaneous solution of these equations will give the polar coordinates of the aircraft A in a horizontal plane, but neglects the altitude L of the aircraft. Where the altitude of the aircraft is included, the slant range R of the aircraft and the elevation angle $\alpha$ are given by the following equations:

$$R=\sqrt{r^2+L^2}=r/\sin\alpha$$

$$d=\sin^{-1}\frac{L}{R}=\tan^{-1}L/r$$

A mechanical solution of the above equations is achieved by devising a dynamic scale model which actually duplicates the relative movements of the aircraft A as shown in Fig. 2, wherein the movements of the block 11 correspond to the movements of the aircraft and the fixed station B corresponds to the column 13. The speed of the aircraft is applied to the device by means of the variable speed motor 15, the speed of the motor being controlled in accordance with the assumed speed of the aircraft A. The resolver 17 converts the rotation of the motor 15 into two components, one representing movement in an east-west direction varying with the sine of the angle $\phi$ applied to the shaft 19 and the other representing movement in a north-south direction varying as the cosine of the angle $\phi$ applied to shaft 21.

The rotation of the shafts 19 and 21 are employed to move the carriage 23 by a system to be later described, and the carriage 25 is mechanically connected to the carriage 23 by means of the post 27, so that the carriages remain one above the other as the carriage 23 is moved. The carriage 25 moves on the parallel revolving tracks 29 which are pivoted about the column 13 so that the angular position of the revolving tracks 29 corresponds to the angle $\theta$. A second electric motor 31 carried by the carriage 25 drives the threaded rod 33, the threaded rod 33 being perpendicular to the revolving tracks 29 and carrying the block 11 thereon. The block 35 is pivotally connected to the block 11 and contains a hole to slidably receive the rod 37 which is pivoted from the column 13, so that the angle between the rod 37 and the revolving tracks 29 corresponds to the elevation angle $\alpha$. The distance of the block 11 from the column 13 corresponds to the slant range R.

The resolver 17 is illustrated more clearly in Fig. 3, and is fully described in my copending application No. 692,021, now Patent No. 2,558,425 of August 26, 1951, previously referred to. The electric motor 15 drives the disc 39 which is frictionally engaged with the disc 41, the disc 41 being frictionally engaged with disc 43 of the same diameter, so that discs 41 and 43 revolve at the same speed which is proportionate to the speed of the disc 39. The wheels 45 and 47 bear on the plane surfaces of discs 41 and 43 respectively, and are driven at speeds proportional to the radial displacement of the respective wheels from the centers of the discs. The radial displacements of the wheels 45 and 47 are controlled simultaneously by means of the Scotch-yoke connections now to be described.

The discs 49 and 51 having the same diameter are mounted above the discs 41, 43 and the wheels 45, 47, and are interconnected by the disc 53, so that the discs 49 and 51 revolve in the same direction and at the same speed. Attached to the discs 49 and 51 are the pins 55 and 57 which engage the Scotch-yokes 59 and 61 respectively, so that the Scotch-yokes move toward and away from the centers of the discs 41 and 43 in simple harmonic motion when the discs 49 and 51 are revolved. The wheels 45 and 47 are attached to the shafts 19 and 21 respectively which are provided with the collars 63 and 65 engaging the Scotch yokes 59 and 61 respectively.

The distance of the pins 55 and 57 from the centers of the discs 49 and 51 is the same, and the discs 49 and 51 are pivoted over the shafts 19 and 21 at points substantially midway between the centers of the discs 41 and 43 and the edge thereof. The distance from the pins 55 and 57 to the respective centers of discs 49 and 51 is proportioned to move the wheels 45 and 47 equal distances on either side of the center of the discs 41 and 43, so that the speed of rotation of the wheels varies from a maximum in one direction through zero to a maximum in the other direction as the discs 49 and 51 are rotated.

Figure 4:
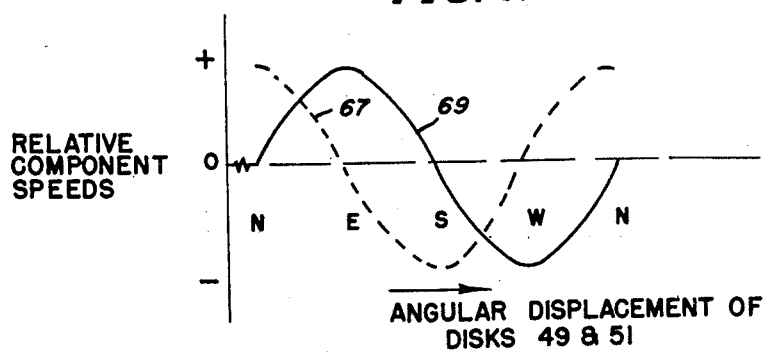
Fig. 4 is a diagram illustrating the operation of the resolver of Fig. 1.

The pins 55 and 57 are angularly displaced from each other by 90°, and the relative velocities of the shafts 21 and 19 are respectively indicated by the curves 67 and 69 in Fig. 4. It will be readily apparent to those skilled in the art that turning the discs 49 and 51 will vary the relative rotation of the shafts 19 and 21 in accordance with the sine and cosine respectively of the angular position of the discs. An indicator 71 is added to the disc 51 to indicate the angular position thereof.

Figure 5:
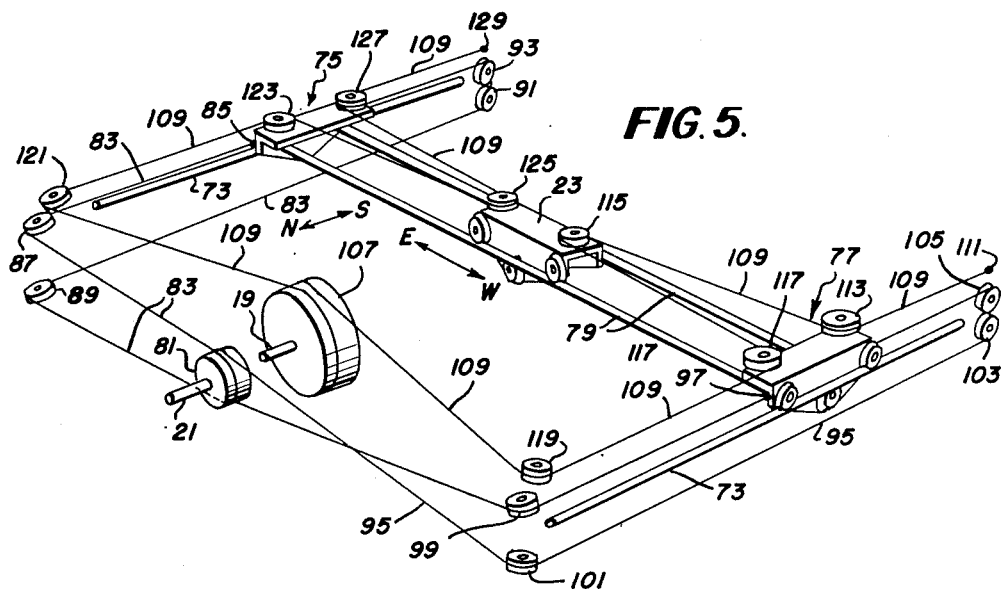
Fig. 5 is a prospective view of the system for integrating rectangular speed components into a position indication of the present invention.

Fig. 5 shows the portion of the present invention which translates the rotation of shafts 19 and 21 into motion in a horizontal plane of the carriage 23. The horizontal tracks 73 are arranged parallel to each other, and support the wheeled trucks 75 and 77 thereon, the trucks 75, 77 being connected by the parallel movable tracks 79, so that the trucks 75 move in a direction parallel to the tracks 73 with the movable tracks 79 perpendicular to the tracks 73.

The trucks 75, 77 are moved along the tracks 73 by means of cables actuated by the shaft 21. As illustrated herein, the drum 81 is secured to the shaft 21, and the cable 83 is looped around the drum and secured to the truck 75 after passing through the following circuit: From the attachment 85 on the truck 75 over the pulley 87 to the drum 81 and thence over the pulleys 89, 91, and 93 to the truck 75. Similarly the cable 95 moves the truck 77 and is arranged as follows: From the point of attachment 97 on the truck 77 over the pulley 99 and around the drum 81 in the direction opposite that of cable 83 and thence over the pulleys 101, 103, and 105 to the truck 77. It will be apparent from an examination of Fig. 5 that clockwise rotation of the shaft 21 moves the movable tracks 79 toward the drum 81, and vice versa.

The shaft 19 is fitted with a drum 107 having a diameter twice that of drum 81, and the carriage 23 is moved on the movable tracks 79 by the cable 109 wrapped around the drum 107. The cable 109 follows the following route: From the fixed attachment 111 over the pulley 113 on the truck 77, the pulley 115 on the carriage 23, the pulley 117 on the truck 77, and over the pulley 119 to the drum 107 and thence over the pulley 121, pulley 123 on truck 75, pulley 125 on carriage 23, and over pulley 127 on truck 75 to the fixed attachment 129. Clockwise rotation of the drum 107 produces movement of carriage 23 toward the truck 77, and vice versa at a speed equal to one-half the cable speed in accordance with well-known principles of physics.

It will be readily apparent to those skilled in the art that the actuation of drums 81 and 107 are entirely independent of each other and that the carriage 23 may be moved in either the east-west or the north-south direction independently of the other, or may be moved in both directions at the same time. Movement of the carriage 23 parallel to the movable tracks 79 by rotation of the drum 107 will herein be referred to as movement in the north-south direction.

Referring now to Fig. 6, the rotating tracks 29 are supported by the column 13 and by the circular track 131 by means of wheels 133 mounted on the ends of the rotating tracks. The circular track 131 is secured in a position below the tracks 73 and coaxial with the column 13. The carriage 25 is attached to the carriage 23 by means of the post 27, so that movement of carriage 23 by the motor 15 moves the carriage 25 to the same position. Movement of the carriage 25 in a direction parallel to the tracks 29 does not shift the angular position of the tracks, but movement in any other direction imparts angular movement to the tracks 29 and the column 13 with or without movement of the carriage 25 relative to the tracks. Thus, any position of the carriage 23 is reproduced as a direction and a distance from the column 13.

The rod 37 is secured to the movable element of an angular position indicator mounted on the column 13, such as the elevation angle potentiometer 135, and the angular position of the rod 37 is controlled by the position of the block 11 on the threaded rod 33. The length of the threaded rod 33 regulates the simulated altitude of the target and is indicated by the symbol L while the displacement of the threaded rod 33 from the elevation angle potentiometer 135 represents the ground range $r$, so that the distance from the block 11 to the center of the Selsyn transmitter 135 represents the slant range R. There is an error introduced in the device by employing a center such as the elevation angle potentiometer 135 rather than the center of the column 13, but the distance between the two centers is small and the error introduced is small in the actual device. The drawings herein have of necessity been exaggerated in parts to clarify the showing of the device. For example, the altitude L of the target will normally be a small part of the ground range $r$. The slant range R is indicated by means of a cable 137 attached to the block 35 and wound on the drum 139, the drum being provided with a take-up spring adapted to maintain the cable tight, so that the angular position of the drum 139 is a measure of the slant range R. Gearing 141 is provided to reduce the variation in the angular position of the drum 139 to less than a single revolution. Displacement of the block 35 may thereby be readily transmitted by rotation of a Selsyn transmitter 143.

Figure 7:
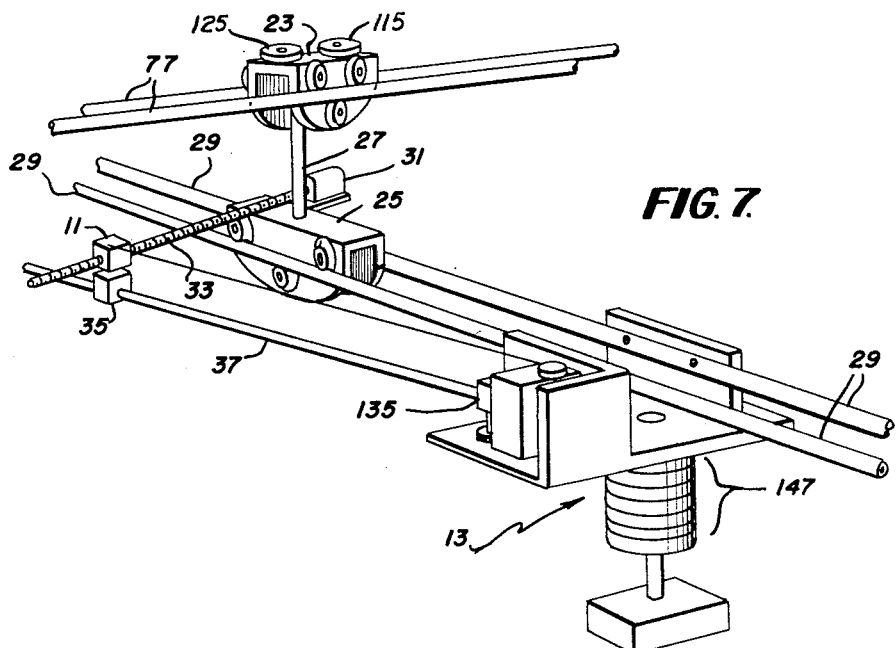
Fig. 7 is a plan view of the polar coordinate system shown in Fig. 4.

The angular position of the column 13 is indicated by means of the Selsyn transmitter 145, and the column 13 is provided with slip rings 147 which cooperate with brushes (not shown) connected to the radar control equipment. Fig. 7 shows the cooperation of carriage 23 and carriage 25, and the structures interconnecting carriage 25 and the column 13.

In operation, the instructor controls the course of the simulated target by rotation of the disc 51 and the speed of the target by varying the speed of the motor 15, so that the carriage 23 is moved in a fashion corresponding to that of the target. Changes in course and speed of the simulated target may be made at any time, and the position of the carriage 23 is an integration of the courses of the simulated target. The altitude of the simulated target is controlled by the motor 37, and the speed of the motor controls the rate of climb or dive of the target. The instructor may therefore duplicate ordinary maneuvers of an aircraft.

This invention is employed with correlating equipment which compares the position of the simulated target with the position of the student's controls, and when the student's controls are set in positions corresponding to the positions of the simulated target, produces an indication on the radar control equipment. Several types of such equipment are known to those skilled in the art, and since the correlation equipment is not part of the present invention, it will not be described in more detail.

It should be understood, of course, that the foregoing disclosure relates to only a preferred embodiment of the invention, and that it is intended to cover all changes and modifications of the example of the invention herein chosen for the purposes of the disclosure, which do not constitute departures from the spirit and scope of the invention as set forth in the appended claims.

Having thus disclosed the invention, what is claimed is:

1. A system for the simulation of target location training problems comprising an adjustable speed motor, a resolver driven by said adjustable speed motor having an angularly adjustable control and two output shafts whose speeds vary with the sine and cosine of the angular position of the angularly adjustable control, a first pair of parallel tracks, a second pair of parallel tracks perpendicular to said first pair of tracks and movable thereon in a direction parallel to said first pair of tracks, a carriage on said second pair of tracks movable thereon in a direction parallel to said second pair of tracks, a drum on each of said output shafts, cable means interconnecting one of said drums and said second pair of parallel tracks for movement thereof in a direction parallel to said first pair of tracks, and cable means interconnecting said carriage and the other of said drums for movement in a direction perpendicular to said first pair of tracks, whereby said carriage moves with a velocity proportional to the speed of said adjustable speed motor and in a direction controlled by the angular position of said angularly adjustable control.

2. A system for the solution of radio detection and ranging trainer problems comprising an adjustable speed drive having an angularly adjustable control and a pair of shafts whose relative speeds vary as the sine and cosine of the angular position of said angularly adjustable control, a first pair of tracks, a second pair of tracks perpendicular to and movably supported on said first pair of tracks in a direction parallel to said first pair of tracks, a first carriage movable on said second pair of tracks in a direction perpendicular to said first pair of tracks, a third pair of tracks below said first and second pairs of tracks, a pivotal support for said third pair of tracks, a second carriage movable on said third pair of tracks mechanically connected to said first carriage, a drum on each of said shafts, cable means operatively connecting one of said drums to said second pair of tracks to move said second pair of tracks in a direction perpendicular to said second pair of tracks, and cable means connecting the other of said drums to said first carriage to move said carriages parallel to said second pair of tracks, whereby said carriages are moved in a direction controlled by said angularly adjustable control at a speed controlled by the speed of said adjustable speed drive and the angular position of said third pair of tracks and said second carriage relative to said pivotal support represent the polar coordinates of the position of a simulated target.

3. The device as claimed in claim 2 which includes a rod pivoted from said pivotal support, an axially shiftable shaft carried by said second carriage perpendicular to said third pair of tracks slidably connected to said rod, whereby the angular position of the intersection of said rod and threaded shaft represents the third polar coordinate of a simulated target in space.

4. In a target simulator for use in remote target location training, a first pair of linear tracks, a pivotal support for said first pair of tracks, a first carriage movable on said first pair of tracks, an axially shiftable shaft carried by said first carriage perpendicular to said first pair of tracks, a first adjustable speed drive for axially shifting said axially shiftable shaft, a rod pivoted to said pivotal support for said first tracks connected to said axially shiftable shaft, a second pair of tracks positioned above said first pair of tracks and symmetrically disposed on opposite sides of said pivotal support, a movable pair of tracks perpendicular to said second pair of tracks movable in a direction parallel to said second pair of tracks, a second carriage movable on said movable tracks in a direction perpendicular to said second pair of tracks and connected to said second carriage, a second adjustable speed drive, a resolver having an angularly shiftable control and two output shafts whose speeds vary as the sine and cosine of the angular position of said angularly shiftable control, a drum on each of said output shafts, first cable means connecting one of said drums and said movable pair of tracks to move said movable tracks in a direction perpendicular thereto, and second cable means connecting the other of said drums to said second carriage, whereby said carriages are moved in a direction controlled by the angular position of said angularly adjustable control at a speed proportional to the speed of said second adjustable speed drive to simulate the horizontal direction and distance of a simulated target from the trainer as the direction and displacement of said second carriage from said pivotal support and the spacial position of the simulated target is simulated by the intersection of said axially shiftable shaft and said rod from said pivotal support.

MARCEL E. DROZ.

REFERENCES CITED

The following references are of record in the file of this patent:

UNITED STATES PATENTS

| Number | Name | Date |
|---|---|---|
| 2,224,182 | Crooke | Dec. 10, 1940 |
| 2,438,898 | Campbell | Apr. 6, 1948 |